No. 805,065. PATENTED NOV. 21, 1905.
H. K. HITCHCOCK.
MANUFACTURE OF GLASS ARTICLES.
APPLICATION FILED MAY 23, 1902.
4 SHEETS—SHEET 1.
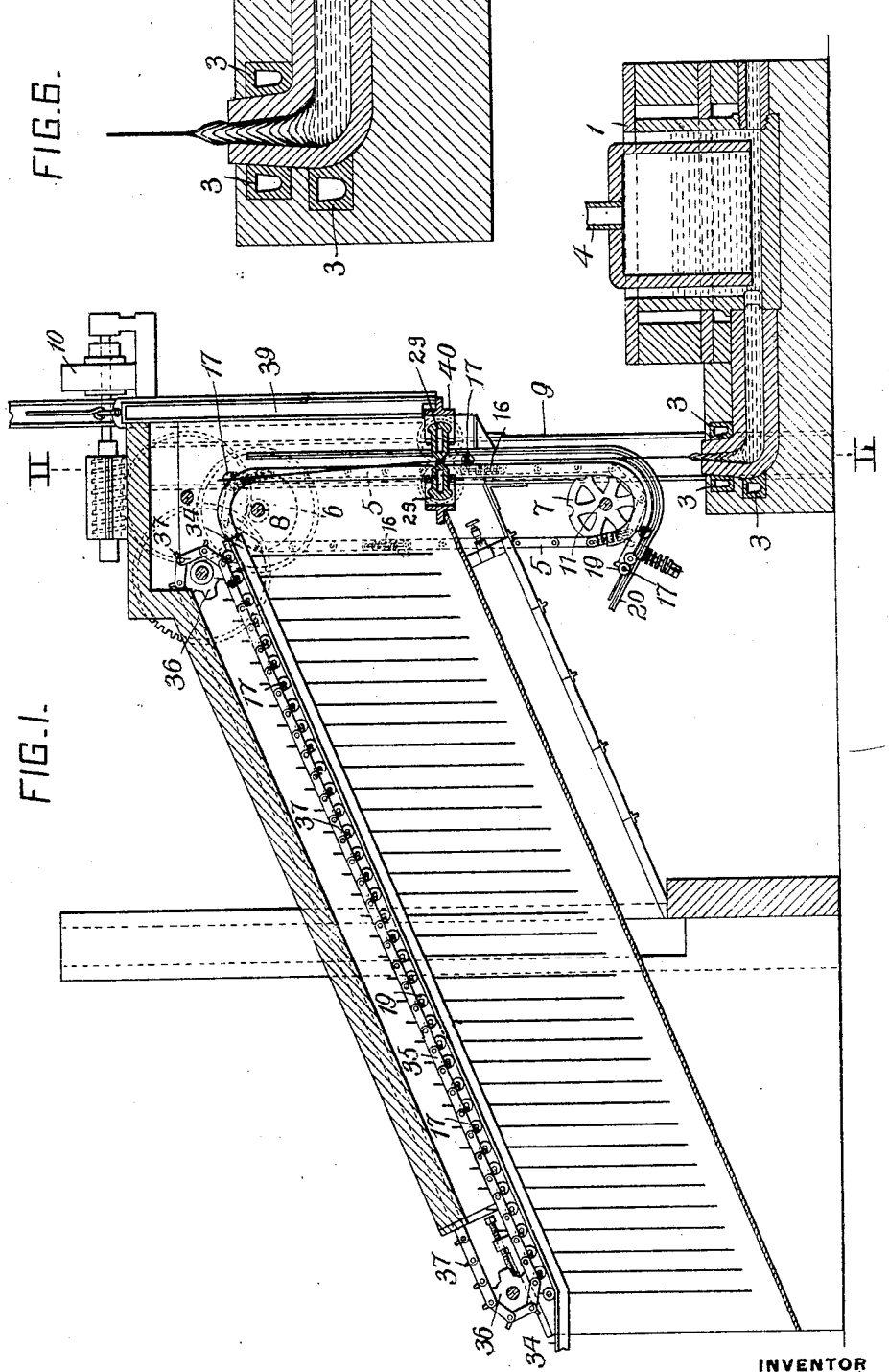
WITNESSES:
Herbert Bradley.
Fred Kirchner.
INVENTOR
Halbert K. Hitchcock
by Dennis B. Wolcott Att'y.

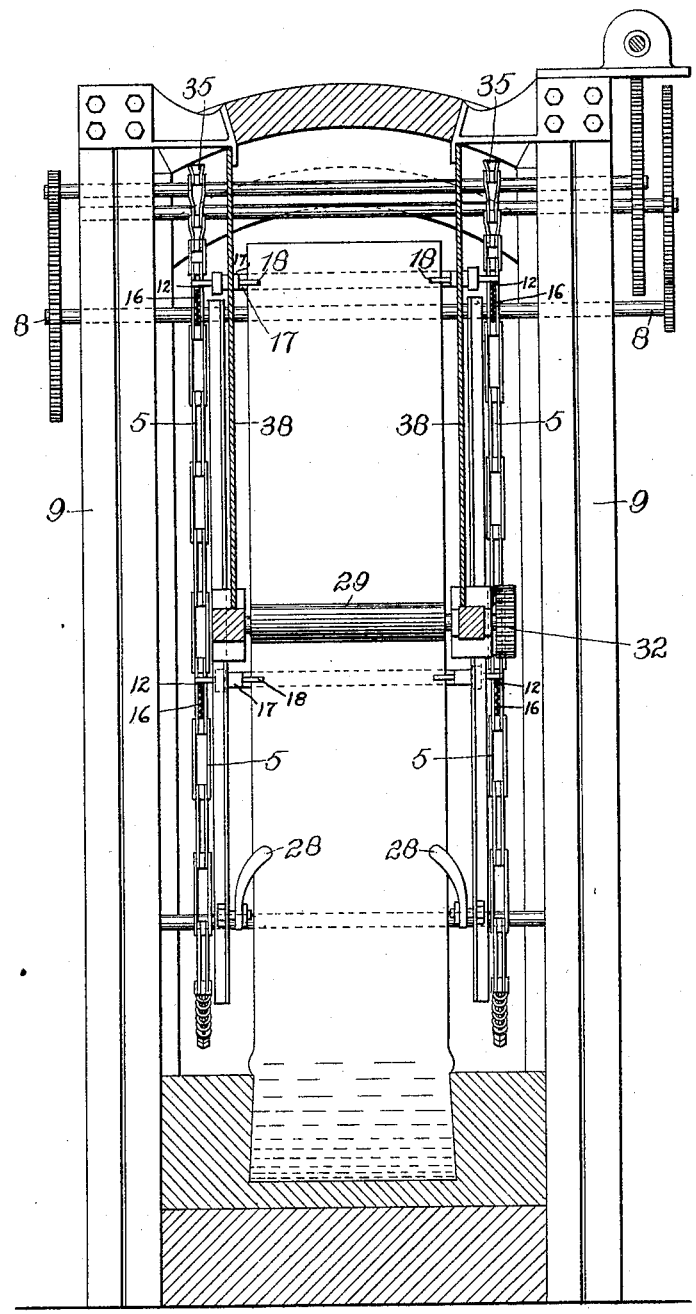

No. 805,065.  
PATENTED NOV. 21, 1905.  
H. K. HITCHCOCK.  
MANUFACTURE OF GLASS ARTICLES.  
APPLICATION FILED MAY 23, 1902.

4 SHEETS—SHEET 3.

WITNESSES:
Herbert Bradley.
Fred Kirchner.

INVENTOR
Halbert K. Hitchcock
by Dannis S. Wolcott Att'y.

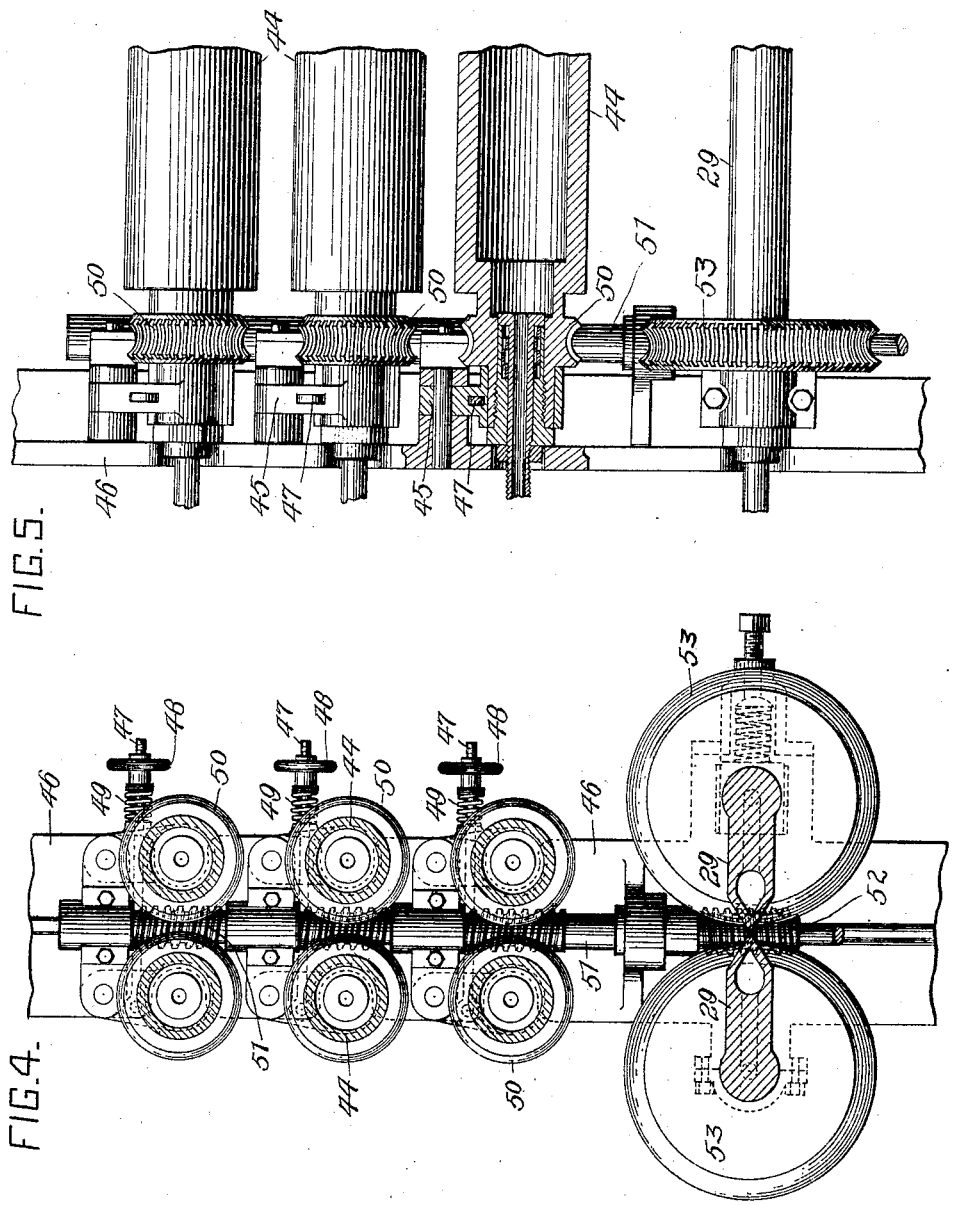

UNITED STATES PATENT OFFICE.

HALBERT K. HITCHCOCK, OF AKRON, OHIO, ASSIGNOR TO HIMSELF AND CHARLES W. BROWN, TRUSTEES, OF PITTSBURG, PENNSYLVANIA.

MANUFACTURE OF GLASS ARTICLES.

No. 805,065.  Specification of Letters Patent.  Patented Nov. 21, 1905.

Application filed May 23, 1902. Serial No. 108,611.

*To all whom it may concern:*

Be it known that I, HALBERT K. HITCHCOCK, a citizen of the United States, residing at Akron, in the county of Summit and State of Ohio, have invented or discovered certain new and useful Improvements in the Manufacture of Glass Articles, of which improvements the following is a specification.

The invention described herein relates to certain improvements in the method of manufacturing sheets or plates of glass direct—*i. e.*, without forming the glass into cylinders.

It has heretofore been attempted to form sheets by drawing the glass in sheet form from a furnace or other suitable receptacle. This method has been unsuccessful, for the reason that the pull effected a narrowing or reduction of transverse area in all directions, so that the sheet is rapidly reduced in width, fining down to a mere strand. It has also been attempted to form sheets by forcing the glass through a long narrow slot, but unsuccessfully, as the pressure of the glass as it emerges from the slot effected an upsetting or thickening of the glass in advance.

The object of the present invention is to provide for such a forced feed of the glass at the point where a shaping-pull is exerted as to compensate for any reduction in width resulting from the shaping or dimensioning pull or draft.

The invention is hereinafter more fully described and claimed.

Figure 2:
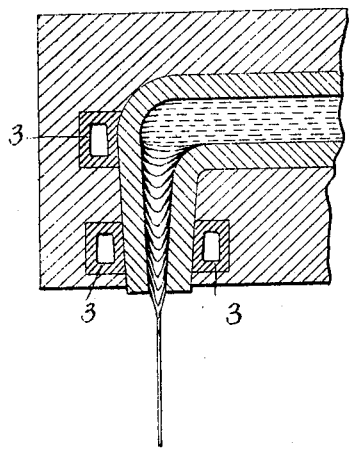
Figure 3:
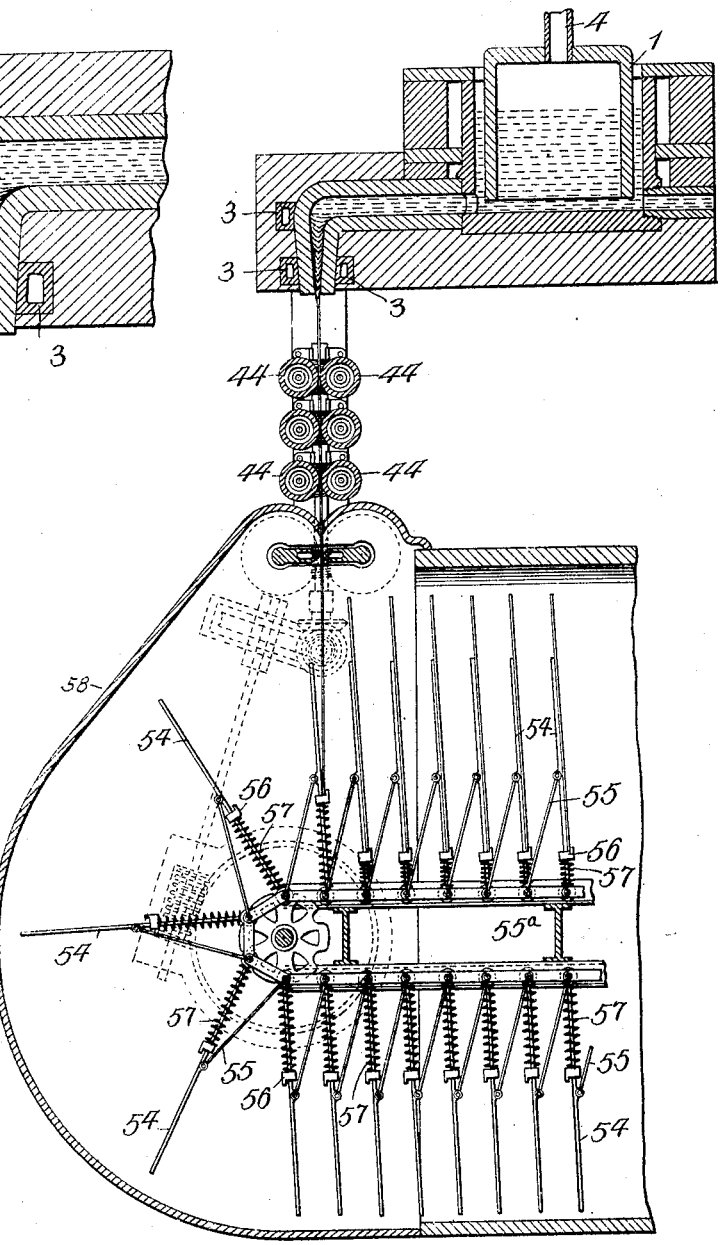

In the accompanying drawings, forming a part of this specification, Figure 1 is a sectional elevation of a form of apparatus suitable for the practice of my invention. Fig. 2 is a vertical section on a plane indicated by the line II II, Fig. 1. Fig. 3 is a view similar to Fig. 1, illustrating a modified form of apparatus for the practice of the invention. Fig. 4 is an enlarged sectional elevation of the controlling-rollers and severing mechanism; and Fig. 5 is a view, partly in front elevation and partly in section, of the parts shown in Fig. 4. Figs. 6 and 7 are in the nature of diagrammatic views illustrative of my improved method.

In the practice of my invention the glass in a molten condition is caused to flow from a suitable containing vessel or chamber 1 and preferably exude from a channel or passage-way which has preferably a transverse length at the point of formation of the glass equal or approximately equal to the width of sheet to be produced. In order to render it certain that the glass should be of the proper temperature as it exudes from the channel, it is preferred to provide suitable means whereby the glass may be heated or cooled as it flows along the channel or passage-way. A convenient means to this end consists in embedding a number of rods 3 of suitable conducting material, as carbon, in the walls of the passage and connecting them in sets of two or more to a suitable electric generator, so that the temperature at any portion of the channel or passage-way may be increased or diminished by regulating the current. In case the glass is too hot as it flows from the receptacle it can be conveniently cooled by forcing air or any cooling fluid through passages formed in the furnace-wall.

The flow of glass from the containing vessel to the point of formation of the article is effected by a controlled pressure. In the forms of apparatus shown the level of the glass in the containing vessel is maintained at a higher point or level than that of the point or plane at which formation of the article is initiated, so that the glass is caused to flow by gravity to the formative point. This flow can be controlled by connecting the chamber with a vacuum-pump by a pipe 4, so that by regulating the vacuum in the containing vessel the flow of glass can be accurately controlled. The outer particles of the stream of glass flowing along the channel are retarded and move slower than the inner particles, so that the glass if not subjected to any tension would assume a convex form as it emerges from the channel or passage. Tension is applied to the glass before it can flow laterally to any detrimental extent, and this tension is sufficient to reduce the glass transversely of its line of flow, and thereby produce the desired contour. As soon as the formation of the article is initiated the controlled pressure on the glass and the formative tension applied thereto are so regulated that the flow to the formative point will equal the movement of glass under tension away from such point.

While any suitable mechanism known in the art may be employed for effecting the elongation and consequent transverse reduction of the glass, it is preferred to employ the mechanism substantially such as is shown, which forms the subject-matter of an application filed August 14, 1901, Serial No. 71,980. This mechanism consists of a pair of endless chains 5, passing over sprocket-wheels 6 and 7, the former being secured to a driven shaft 8, mounted in suitable bearings on the frame 9 and driven through suitable interposed gearing by a motor 10. The wheels 7 are carried by a shaft 11, supported in bearings on the frame 9, and so arranged with reference to the feed-slot that the upward-moving portions of the chains will be in a plane parallel with a vertical plane passing through the slot, as shown in Fig. 1. The chains are provided with a series of hooks 12 for engagement with the glass clamp or grip. It is preferred that the hooks should be yieldingly connected to the chains to prevent any sudden shock or strain to the glass when the grips are caused to engage the sheet. The hooks are supported by springs 16, surrounding rods, as shown in Fig. 1. The grip consists of a bar 17, provided with gripping-fingers 18, so constructed and mounted that by a partial rotation they will clamp the edges of the glass against the bar. The bar is provided outside of the fingers with wheels 19, loosely mounted thereon and adapted to move along suitable rails in the annealing-oven, as hereinafter described. A series of these grips is placed on inclined supporting-rails 20, which extend down to suitable proximity to the lower sprocket-wheels 7 or to the path of the hooks 12 as they are carried around the sprocket-wheels 7. Suitable stop mechanism, such as is shown and described in the application referred to, is employed to insure the presentation of the grips one at a time to the hooks. As the grips are carried around by the hooks, portions of the fingers 18 will lie outside of the edges of the sheet of glass being drawn until such portions reach the closing-stops 28, which are secured to the frame 9, as clearly shown in Fig. 2. By the engagement of these fingers with the closing-stops the fingers are turned down in front of the sheet, pressing the edges thereof against shoulders formed on the gripping-bar 17.

By the operation of the chains and gripping-bar the sheets are drawn to a suitable height, and provision is made for severing the sheet immediately above each bar after the preceding grip has reached a predetermined height, dependent upon the length of sheet desired. A convenient mechanism for that purpose is clearly shown in Figs. 1, 2, and 4 and consists of blades 29, provided at their ends with trunnions, which are mounted in suitable bearings on the frame 9. These blades are arranged on opposite sides of the plane of movement of the sheet and are rotated so that their inner or cutting edges while operating to crack the sheet are moved in the same direction and at the same speed as the sheet. This rotation of the blades is effected by means of rack-bars secured to the lifting-chains 5 in such relation to the hooks 12 that the blades will be brought around so that their inner edges will simultaneously contact with and bear upon opposite sides of the sheet in a line a short distance above the grip. This rack-bar intermeshes with a pinion 32, secured upon the trunnion of one of the blades and intermeshing with a corresponding pinion of the trunnion of the other blade. It is preferable that the hooks and severing mechanism should be so located with relation to the travel of the sheets that the blades will operate upon the sheet just at the time that the preceding grip is beginning to pass around the upper sprocket-wheels 6, so that a slight bend or flexure will be given to the sheet, thereby facilitating its cracking off at the point or line of pressure of the blades.

The grips are carried around the sprocket-wheel 6 with the severed section suspended therefrom, and the rollers 19 on the grips are deposited upon the inclined rails 34, which extend into a suitable annealing-oven. The travel of the grips with the sheets through the annealing-oven is controlled by endless chains 35, passing around sprocket-wheels 36, one of which is driven through suitable interposed gearing by the motor 10. The chains are provided with projections 37, which extend down sufficiently to engage the grips and regulate their movement down the inclined rails.

The sides of the front end of the annealing-chamber are formed by plates 38, which extend between the chains 5 and are slotted for the movement of the projecting ends of the several grips. These side plates extend down to or a little beyond the severing mechanism, and the front of the annealing-chamber is closed by a movable door 39, which also extends down to a suitable support 40 in proximity to the severing mechanism. This construction will entirely protect the sheets as they are drawn up between the severing devices from drafts of air, which would be liable to effect an unequal cooling and consequent warping of the sheets.

In forming sheets with the apparatus described the glass in the furnace is maintained at such a level above the orifice of the channel or slot as to produce sufficient pressure to effect the desired flow or movement of the glass to such orifice. The movement or flow produced by difference of level is preferred as giving more uniform results as regards the flow of the glass to the orifice; but such flow could be effected by forcing the air or gas into the receptacle or chamber containing the glass-supply.

In starting the apparatus the glass is forced out of the chamber or passage to permit a suitable bait being attached thereto so as to draw up by hand or otherwise a sufficient length of sheet to permit the grips to engage therewith. Thereafter the grips are caused to engage the edges of the sheet automatically and at suitable intervals. In initiating the operation it is preferred that a little more glass than is necessary to form the article should be forced through the orifice and that this mother body or quantity of glass should be at all times maintained; but care should be taken that this excess of glass at the formative point should not become so large or to assume such surface that the radiation of heat therefrom will become greater than the heat units supplied thereto by the glass fed to the formative point by pressure. As hereinbefore stated, the movement of the inner particles to the formative point is faster than the outer particles of the stream, so that the feed of glass to the portions being shaped or formed and also the movement of the glass away from the formative point may be considered to be, theoretically at least, in three layers, the inner layer being the inner particles of the stream or mass of glass, and the outer layers will come from the outer particles, which, being the less plastic and fed less rapidly to the formative point, will be subjected to some greater tension than the particles of the inner portions, thereby subjecting such particles to the stretch or elongation necessary to produce a highly-polished surface. The outer particles are prevented from too great a cooling or solidification by the units of heat supplied thereto by the inner particles. It may be considered that in the formation of a sheet or other article two layers of glass are arranged or placed on opposite sides of a layer of more plastic and highly-heated glass. After the formation of the article has been initiated the feed of glass to the formative point should be equal to the movement of glass away from such point under formative tension. While it is preferred to maintain a small body of glass in excess of that required to form the article immediately outside of the end of the channel or passage-way, it is possible to practice my invention and to obtain good results by so operating the apparatus employed that the formative point will occur within the channel or passage-way, and for this reason the term "orifice" is used as synonymous with the term "formative point" or point where pressure ceases and tension begins, and such orifice may be either above or below or at one side of the actual physical end of the channel or passage-way.

While not necessary, it is preferred to arrange cooling-rollers 44 adjacent to the point at which formation begins and on opposite sides of the line of movement of the sheet, so as to have a cooling and calendering effect thereon. It is preferred to support the rollers in such manner that their pressure will be due to and controlled entirely by the weight of the rollers themselves. To this end arms 45 are adjustably secured to suitable supports at opposite ends of the passage-way or channel in such manner as to serve as supports for the journals of the rollers 44. By changing the angle of these supporting-arms the rollers can be caused to bear with greater or less pressure against the sides of the sheet. If necessary, blast-pipes 43, having their discharge-openings arranged to cause the air to impinge upon the glass can be arranged in such relation to the slot as to cool the glass as it flows therefrom.

As shown in Figs. 3 and 7, gravity may be employed for effecting the stretching and consequent thinning of the sheets or shaping of other articles. As shown in Fig. 3, the channel or passage-way is so formed that flow of glass through the channel is effected by or is due to the controlled action of gravity. As the sheet elongates, it passes down between a series of pairs of rollers 44, mounted in suitable bearings on opposite sides of the path of the movement of the sheet. These rollers bear lightly upon the surfaces of the sheet and are rotated in such manner as to control the downward movement of the sheet and regulate the pull on the glass as it flows from the channel or passage-way, thereby counterbalancing the increasing weight of the sheet as it is forced through the channel. In order to regulate the pressure of these rollers on the sheet, their bearings are formed at the ends of the arms 45, pivotally mounted upon the side frames 46. Rods 47 are passed through slots in one of each of the pairs of the arms and are connected to the opposite arm of the pairs. Said arms are drawn toward each other to increase the pressure of the rollers of the sheets by means of hand-wheels 48, screwing onto the ends of the rods and bearing through the medium of springs 49 against one of the arms. The pivots are so arranged that when hanging freely the rollers will barely contact with the sides or surfaces of the sheet. On the journals at one end of these rollers are secured worm-wheels 50, which intermesh with worms on the shaft 51. This shaft is driven by any suitably-arranged motor. The severing mechanism, which is arranged below the regulating-rollers, is similar to that described in connection with the construction shown in Fig. 1 and consists of blades 29, rotatively mounted and driven at the same rate of speed as the feed of the glass by a worm 52 on the shaft engaging worm-wheels 53 on the trunnions of the blades. One of the blades is adjustably mounted, so that it can be moved toward and from the other, according to the thickness of glass operated. This adjustment, however, will not be sufficient to shift worm-wheels 53 out of engagement with the worm 52.

A desirable mechanism for receiving the sheet as it is severed by the blades consists of a series of fingers 54, carried by sprocket-chains 55$^a$, which pass through the annealing-oven. These fingers are supported or braced in receiving position by arms 55, extending down to the sprocket-chain. On the fingers are mounted blocks 56, yieldingly supported by springs 57, surrounding the fingers. The sprocket-chains 55 are so moved with relation to the rate of formation of the sheet that the blocks 56 will be brought immediately under the lower end of the sheet just at the time that the blades operate on the sheet, so that by the continued forward movement of the fingers a slight flexure of the sheet is effected to facilitate or complete the cracking off of the sheet. After being cracked the sheet will rest in an inclined position upon the fingers and will be carried through the annealing-oven. The front end of the annealing-oven is closed by a metal shell 58, having a slot for the entrance of the sheet to prevent any unequal cooling of the sheets.

It is characteristic of the method heretofore attempted—i. e., pulling the sheet from a body of molten glass—that the narrowing occurs closely adjacent to the molten body or point of greatest plasticity of the sheet; but by feeding the glass to the point where the pull or elongation occurs, so that there will be a constant and uniform supply, and by cooling the glass as the elongation occurs, all narrowing of the sheet is avoided.

It will be understood that in beginning the operation in the form of apparatus shown in Fig. 3 a perfect sheet will not be formed until sufficient weight of glass has flowed out to exert the required pull on the glass as it comes from the slot. As soon as sufficient weight of glass has passed out the rollers 44 are adjusted against the sheet so as to maintain a uniform tension on the glass as it exudes from the slot. These rollers may be made to bear only lightly on the glass and be rotated in the direction opposite the movement of the glass, or they may be caused to grip the sheet and be rotated in the direction of the movement of the sheet.

It is characteristic of plastic materials when forced through a channel or passage-way to spread out laterally in all directions as soon as freed from the restraint of the walls of the passage or channel. This lateral spreading action is utilized to prevent the "threading out" resulting from pulling a portion of plastic material from another. The spreading out of the glass when freed from pressure will counteract the inward movement due to the tension, and the dimensions of the article produced will be parallel with the line or lines where the spreading and contracting forces counterbalance each other. By properly adjusting the feed and tension the article produced can be made to vary in transverse dimension within comparatively wide limits.

It is characteristic of my improvement that the severing of the sheets into sections of desired lengths is effected at a point or line outside of the point or line at which the formative tension is applied to the glass, so that the formative tension is applied continuously or without interruption, and sections of any desired length may be produced, and, further, as there is not any interruption in the formation of the sheet or plate the formative tension may be made uniform, thereby avoiding variations in thickness.

Glass is a body whose molecules move with extreme difficulty over each other when at ordinary temperature, but which passes gradually through all degrees of plasticity and viscosity as the temperature is increased until at a very high temperature it is as liquid as water. This property of plasticity which glass possesses during its passage from a liquid to a solid state makes it an ideal substance for manipulation by my improved process. It is possible by the method herein described to first subject the glass to a protracted treatment at a given temperature, so as to reduce the plastic mass to uniform condition as regards heat and plasticity, then to force it through a canal or conducting-chamber out through an orifice of a shape similar to that required in the finished product, and, finally, to subject it to a tension sufficient to stretch it to the desired form. The tension, however, cannot be applied to the body of the glass still in the orifice for reasons I will hereinafter set forth. In this method the molten glass is forced through the orifice of shape similar to that of the required product to the formative point under pressure—that is, the stress in the plastic body is what is known in mechanics as "compression," the strain tending to force the molecules closer together. At this point the processes are reversed and the plastic body is subjected to tension stress, which tends to pull the molecules apart and place the glass in such a condition of tension that the strain shall be greater than the elastic limit of the body and will stretch it to its required dimension. Three conditions are here desirable, first, that the glass should be in a plastic condition, that the plastic body behind the orifice should be in compression, and, lastly, that the body beyond the orifice should be in tension. By the term "orifice" is meant that part of the canal or chamber leading out of the receptacle for the plastic glass where the surface of the glass leaves the wall of the containing-chamber. This orifice is preferably at the end of the canal or chamber, but may in practice be carried inward somewhat if the chamber is of the proper size and shape. As I have said, the plastic glass is first reduced to a state of uniform temperature, in which it is still plastic, but of a moderately high viscosity. It is now desirable to allow this plastic body to lose its heat by conduction and radiation through the enveloping wall of the orifice in such a way that that part of the body in contact with these walls shall become much less plastic than the inner core of glass, (passing up through the center,) and the ideal condition is reached where heat enough is dissipated so that the adhesion of the outer layer of glass against the containing-walls of the orifice is sufficient (but not more than enough) to resist all strain to which it is subjected and prevent any movement upon the part of this extreme outer layer. In this way the plastic glass which forms the sheets is forced up between retaining-walls, as it were, of less plastic glass and after exuding from the orifice is pulled away from a body of its own composition in such a manner as to give it a fine skin or surface possessing a fine luster. Glass being a poor conductor of heat, it is possible to so adjust the heat conductivity and heat dissipation of the envelop to the orifice that the heat carried to the wall from the onward-moving hot glass shall just equal that dissipated from the enveloping walls; but this is extremely difficult, as a certain amount of time is required to adjust the speed of the drawing mechanism to the temperature and the flow of the glass through the orifice. It is therefore expedient to control this radiation to suit the other conditions by furnishing to the enveloping walls a certain quantity of heat by means of an electrical or gas furnace which shall supply enough heat to balance that dissipated by the walls composing the orifice to maintain the condition ideal under all conditions of the exuding glass as regards velocity and temperature. It is also desirable that the glass shall be taken away from the orifice at the same speed as regards quantity as it is forced therefrom, so as to maintain the orifice at the same point in the chamber, although in practice this may vary somewhat in or out, according to size of orifice, temperature of glass, &c. The success of this process depends mainly upon the relation of three forces in the plastic body—namely, the variable viscosity of the glass at various temperatures, the maintenance of thermal equilibrium in the various zones of the plastic, semiplastic, and vitreous or semivitreous material, and the speed at which it is forced from the orifice. For instance, the radiation of heat from the walls of the orifice or mouth from which the glass passes should practically equal the heat conducted thereto from the plastic glass which forms the stream in the center of the orifice. If the heat increments exceed the dissipation, the viscosity would decrease, ultimately allowing the glass in contact with the walls of the chamber or mouth to slough off, and thereby impair the surface (or skin) of the glass.

The adherence of the glass to the channel or passage at the orifice of the latter or adjacent thereto forms, as it were, an anchorage or abutment acting in opposition to the pull or tension to a sufficient extent to insure by the pull or tension the desired reduction. The glass in the anchor or abutment will be constantly changed in whole or in part by the movement of the glass away therefrom under the pull or to the anchor by the feed-pressure. Only the portion of the glass going to form the skin or envelop is thus progressively anchored and thus subjected to tension.

I claim herein as my invention—

1. As an improvement in the art of manufacturing glass sheets or plates the method herein described which consists in the continuous formation of an envelop or shell of relatively cool but plastic glass and maintaining the shape and dimensions of such envelop by the continuous feed of the glass to the interior of such envelop.

2. As an improvement in the art of manufacturing sheet-glass the method herein described which consists in the continuous formation of an envelop or shell of relatively cool but plastic glass from a relatively non-movable body of glass and maintaining the shape and dimensions of such shell or envelop by the continuous feed of glass at a higher temperature to the interior of such envelop.

3. The method herein described of producing sheets or plates of any desired length which consists in providing a mother body of glass causing a continuous movement of glass from said mother body by continuously-applied tension whereby a portion of such body is caused to assume the desired shape, reducing the surface temperature of the glass below that of the interior portions whereby a greater tension or pull is required to shape the surface portions than the interior portions.

4. The method herein described of manufacturing sheets or plates of glass which consists in effecting a continuous feed of glass through a slot or opening reducing the surface temperature of the glass as it exudes from the slot below that of the interior portions of the glass so as to necessitate a greater forming pull on the surface portions, applying a constant shaping tension to the glass as it exudes from the slot, the tension being so regulated as to cause the glass to move away from the slot at or approximately at the rate at which the glass is fed through the slot and transversely dividing the sheet at a point outside of that at which the shaping is applied.

5. As an improvement in the art of manufacturing sheet-glass the method herein described which consists in subjecting the cooled envelop to a formative tension causing the more plastic glass to move along with and within the envelop whereby such envelop serves as lateral retaining-walls for the more plastic glass.

6. The method herein described which consists in forcing the molten glass to a formative point at an orifice having a shape similar to the finished article, here cooling the surface of said glass so as to form an envelop having a higher tensile strength than the glass in body of said orifice and stretching the body to the required shape.

7. The method herein described which consists in forcing molten glass to a formative point at an orifice having a shape similar to the finished article, cooling the entire surface of said glass so as to give it a greater tensile strength than the body of said glass and stretching the same under tension to the desired dimensions as fast as the glass is forced to said formative point.

8. The method herein described which consists in cooling the surface of molten glass in contact with the walls of a channel having a shape similar to the finished article and causing the molten glass to flow into and along with envelop thus formed and which acts as an elastic containing-envelop to determine the shape and dimensions of the desired product.

9. The method herein described which consists in causing a continuous stream of molten glass to flow to a formative point near the end of a slot or chamber having a shape similar to the finished article, then subjecting the surface of the glass to a cooling action sufficient to increase the tensile strength of such surface and stretching the same by means of tension so applied as to remove the glass substantially at the same rate as it flows to such formative point.

10. The method herein described which consists in forcing the glass to a point at or near the end of a channel or orifice having a shape similar to the finished article, cooling the surface of said glass to the line of contact with such channel or orifice and stretching by means of tension such body of glass to the desired dimensions.

11. The method herein described which consists in forcing molten glass to a point at or near the end of a channel or orifice having a shape similar to the finished article, cooling the surface of said glass to the line of contact with the enveloping channel or orifice and causing the more molten glass to flow up into and along with the surrounding envelop of colder and tougher glass whereby the outer layer of colder glass will prevent the natural tendency of the glass to either spread out or narrow down.

In testimony whereof I have hereunto set my hand.

HALBERT K. HITCHCOCK.

Witnesses:
DARWIN S. WOLCOTT,
F. E. GAITHER.